(12) United States Patent
Toraya

(10) Patent No.: US 11,852,597 B2
(45) Date of Patent: Dec. 26, 2023

(54) DEGREE-OF-CRYSTALLINITY MEASUREMENT APPARATUS, DEGREE-OF-CRYSTALLINITY MEASUREMENT METHOD, AND INFORMATION STORAGE MEDIUM

(71) Applicant: Rigaku Corporation, Akishima (JP)

(72) Inventor: Hideo Toraya, Akishima (JP)

(73) Assignee: RIGAKU CORPORATION, Tokyo (JP)

( * ) Notice: Subject to any disclaimer, the term of this patent is extended or adjusted under 35 U.S.C. 154(b) by 87 days.

(21) Appl. No.: 17/832,789

(22) Filed: Jun. 6, 2022

(65) Prior Publication Data

US 2022/0390392 A1 Dec. 8, 2022

(30) Foreign Application Priority Data

Jun. 7, 2021 (JP) .................... 2021-095294

(51) Int. Cl.
*G01N 23/20* (2018.01)
(52) U.S. Cl.
CPC ..... *G01N 23/20* (2013.01); *G01N 2223/0566* (2013.01); *G01N 2223/60* (2013.01)
(58) Field of Classification Search
CPC ............... G01N 23/20; G01N 23/2055; G01N 2223/0566; G01N 2223/60
See application file for complete search history.

(56) References Cited

U.S. PATENT DOCUMENTS

2018/0364183 A1 12/2018 Toraya et al.
2021/0020272 A1* 1/2021 Godwin ................ G01N 23/20

FOREIGN PATENT DOCUMENTS

WO 2017149913 A1 9/2017

OTHER PUBLICATIONS

Rutland, "X-ray Determination of Crystallinity and Diffuse Disorder Scattering"; Acta Cryst. vol. 14, Jan. 11, 1961; pp. 1180-1185.
Toraya, "A new method for quantitative phase analysis using X-ray powder diffraction: direct derivation of weight fractions from observed integrated intensities and chemical compositions of individual phases", Journal of Applied Crystallography, vol. 49, Jun. 28, 2016; pp. 1508-1516.

* cited by examiner

*Primary Examiner* — Jurie Yun
(74) *Attorney, Agent, or Firm* — CANTOR COLBURN LLP

(57) ABSTRACT

A measured pattern acquisition unit acquires a measured X-ray scattering pattern of a sample containing a target substance and another known mixed substance. A known pattern acquisition unit acquires a known X-ray scattering pattern of the other known mixed substance. A crystalline pattern acquisition unit at least partially acquires an X-ray diffraction pattern of a crystalline portion included in the target substance. A crystalline integrated intensity calculation unit calculates an integrated intensity for the acquired X-ray diffraction pattern of the crystalline portion. A target substance integrated intensity calculation unit calculates an integrated intensity for an X-ray scattering pattern of the target substance. A degree-of-crystallinity calculation unit calculates a degree of crystallinity of the target substance based on the integrated intensity for the X-ray diffraction pattern of the crystalline portion and the integrated intensity for the X-ray scattering pattern of the target substance.

8 Claims, 10 Drawing Sheets

DEGREE-OF-CRYSTALLINITY MEASUREMENT APPARATUS, DEGREE-OF-CRYSTALLINITY MEASUREMENT METHOD, AND INFORMATION STORAGE MEDIUM

CROSS-REFERENCE TO RELATED APPLICATIONS

The present invention claims priority under 35 U.S.C. § 119 to Japanese Application No. 2021-095294, filed on Jun. 7, 2021, the entire contents of which being incorporated herein by reference.

BACKGROUND OF THE INVENTION

1. Field of the Invention

The present disclosure relates to a degree-of-crystallinity measurement apparatus, a degree-of-crystallinity measurement method, and an information storage medium, and more particularly, to measurement of a degree of crystallinity using X-ray diffraction.

2. Description of the Related Art

Polymers include crystalline polymers and amorphous polymers. However, even in a crystalline polymer, the crystalline polymer does not have an entirely crystalline structure and includes a crystalline portion and an amorphous portion as a mixture. A proportion of a weight of the crystalline portion with respect to an overall weight of the crystalline polymer is referred to as "degree of crystallinity." The degree of crystallinity is important information in understanding properties of the crystalline polymer, such as a mechanical property and a chemical property.

In various methods of measuring the degree of crystallinity, a method using X-ray diffraction has great practical advantages in that a sample of any size may be used, and in that the method can be executed without destroying the sample, for example.

In the method using the X-ray diffraction, a degree of crystallinity of a target substance corresponds to a value obtained by dividing an integrated intensity of a scattering pattern (which is, in this case in particular, a diffraction pattern) from the crystalline portion of the target substance by a sum of integrated intensities of scattering patterns from the crystalline portion and the amorphous portion (that is, an integrated intensity of a scattering pattern of the entire target substance).

Accordingly, in order to determine the degree of crystallinity, it is required to accurately identify at least the scattering pattern (diffraction pattern) from the crystalline portion. However, the diffraction pattern from the crystalline portion, which is weak in diffraction intensity in a high-angle region, is buried in scattering patterns from the amorphous portion and other substances and is difficult to identify. Further, when the crystalline polymer is mixed with other mixed substances such as a filler, and especially with an amorphous mixed substance such as glass fiber, it becomes more difficult to separate the scattering pattern from those mixed substances.

SUMMARY OF THE INVENTION

According to at least one embodiment of the present disclosure, there is provided a degree-of-crystallinity measurement apparatus, including: a measured pattern acquisition unit configured to acquire a measured X-ray scattering pattern of a sample containing a target substance and another known mixed substance; a known pattern acquisition unit configured to acquire a known X-ray scattering pattern of the other known mixed substance; a crystalline pattern acquisition unit configured to at least partially acquire, based on the measured X-ray scattering pattern of the sample, an X-ray diffraction pattern of a crystalline portion included in the target substance; a crystalline integrated intensity calculation unit configured to calculate an integrated intensity for the acquired X-ray diffraction pattern of the crystalline portion; a target substance integrated intensity calculation unit configured to calculate an integrated intensity for an X-ray scattering pattern of the target substance based on the measured X-ray scattering pattern of the sample and the known X-ray scattering pattern; and a degree-of-crystallinity calculation unit configured to calculate a degree of crystallinity of the target substance based on the integrated intensity for the X-ray diffraction pattern of the crystalline portion and the integrated intensity for the X-ray scattering pattern of the target substance.

Further, according to at least one embodiment of the present disclosure, there is provided a degree-of-crystallinity measurement method, including: a measured pattern acquisition step of acquiring a measured X-ray scattering pattern of a sample containing a target substance and another known mixed substance; a known pattern acquisition step of acquiring a known X-ray scattering pattern of the other known mixed substance; a crystalline pattern acquisition step of at least partially acquiring, based on the measured X-ray scattering pattern of the sample, an X-ray diffraction pattern of a crystalline portion included in the target substance; a crystalline integrated intensity calculation step of calculating an integrated intensity for the acquired X-ray diffraction pattern of the crystalline portion; a target substance integrated intensity calculation step of calculating an integrated intensity for an X-ray scattering pattern of the target substance based on the measured X-ray scattering pattern of the sample and the known X-ray scattering pattern; and a degree-of-crystallinity calculation step of calculating a degree of crystallinity of the target substance based on the integrated intensity for the X-ray diffraction pattern of the crystalline portion and the integrated intensity for the X-ray scattering pattern of the target substance.

Further, according to at least one embodiment of the present disclosure, there is provided a non-transitory computer-readable information storage medium storing a program for causing a computer to execute: a measured pattern acquisition step of acquiring a measured X-ray scattering pattern of a sample containing a target substance and another known mixed substance; a known pattern acquisition step of acquiring a known X-ray scattering pattern of the other known mixed substance; a crystalline pattern acquisition step of at least partially acquiring, based on the measured X-ray scattering pattern of the sample, an X-ray diffraction pattern of a crystalline portion included in the target substance; a crystalline integrated intensity calculation step of calculating an integrated intensity for the acquired X-ray diffraction pattern of the crystalline portion; a target substance integrated intensity calculation step of calculating an integrated intensity for an X-ray scattering pattern of the target substance based on the measured X-ray scattering pattern of the sample and the known X-ray scattering pattern; and a degree-of-crystallinity calculation step of calculating a degree of crystallinity of the target substance based on the integrated intensity for the X-ray diffraction pattern of the crystalline portion and the integrated intensity for the X-ray scattering pattern of the target substance.

DETAILED DESCRIPTION OF THE INVENTION

A description is given below in detail of an embodiment of the present disclosure, based on the drawings.

(Apparatus Configuration)

Figure 1:
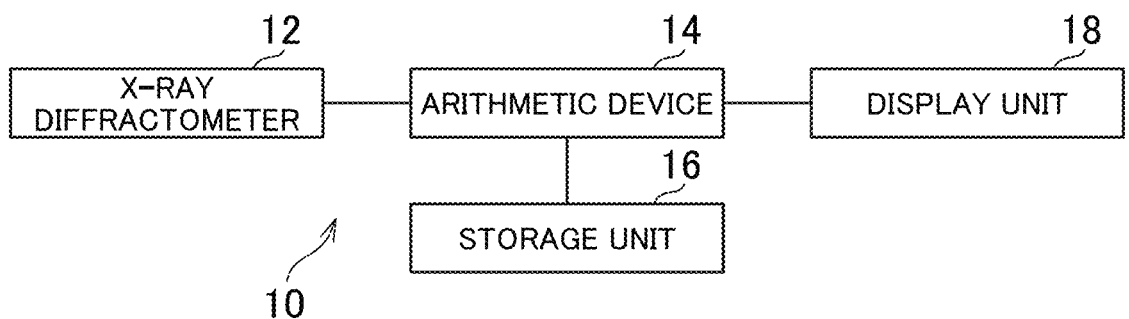
FIG. 1 is a configuration diagram of a degree-of-crystallinity measurement apparatus according to an embodiment of the present disclosure.

FIG. 1 is a diagram illustrating a configuration of a degree-of-crystallinity measurement apparatus according to an embodiment of the present disclosure. As illustrated in FIG. 1, a degree-of-crystallinity measurement apparatus 10 includes an X-ray diffractometer 12, an arithmetic device 14, a storage unit 16, and a display unit 18. When a degree of crystallinity is calculated based on a measured pattern acquired from another X-ray diffractometer, it is not required that the degree-of-crystallinity measurement apparatus 10 includes the X-ray diffractometer 12. In this case, the degree-of-crystallinity measurement apparatus 10 may be formed of the arithmetic device 14, the storage unit 16, and the display unit 18, and in the storage unit 16, the measured pattern acquired from the other X-ray diffractometer is stored in advance.

The X-ray diffractometer 12 performs X-ray diffractometry. Specifically, the X-ray diffractometer 12 allows an X-ray of a known wavelength to enter a sample and measures an intensity of a scattered X-ray. Data of the X-ray intensity for each value of a diffraction angle 2θ is output as a measured pattern from the X-ray diffractometer 12 to the arithmetic device 14. The measured pattern output to the arithmetic device 14 may be a measured pattern subjected to correction with a Lorentz-polarization factor (Lp correction). The X-ray diffractometer 12 can measure the intensity of the scattered X-ray at each diffraction angle from a minimum angle 2θL that is as small as about 100 to a maximum angle 2θH that is as large as about 120°. In the present application, a profile of the X-ray intensity measured by the X-ray diffractometer 12 (data indicating a change in X-ray intensity with respect to a change in diffraction angle) is referred to as "X-ray scattering pattern." The X-ray scattering pattern is in particular an "X-ray diffraction pattern" when the sample is crystalline.

In this embodiment, as the sample serving as a measurement target of the X-ray scattering pattern, a target substance such as a polymer in a powdery form or having fluidity, which may be in a crystalline state in part and in an amorphous state in the remainder, mixed with one or a plurality of other known substances (mixed substances) such as fillers in powdery forms, for example, may be used. When the sample is produced, types and a weight ratio of a plurality of substances forming the sample are known. A chemical formula and a chemical formula weight of each substance are also known. Further, an X-ray scattering pattern of the mixed substances is also known. In the following description, a measurement target substance is in a bulk solid form. When such a measurement target substance is synthesized, the polymer in powdery form or having fluidity, and a plurality of other known substances in a powdery form, such as fillers, are mixed. Such a mixture is subjected to forming and heating processing to produce a resin material of a product, which is the sample. As a matter of course, the present invention is applicable not only to a sample in a bulk solid form, but also to a sample in a powdery form.

The arithmetic device 14 is formed of, for example, a publicly known computer system, and includes a CPU and a memory. The storage unit 16 formed of a computer-readable information storage medium such as a solid state disk (SSD) or a hard drive disk (HDD) is connected to the arithmetic device 14. The storage unit 16 stores a degree-of-crystallinity measurement program in an embodiment of the present disclosure, and the apparatus and the method according to an embodiment of the present invention are implemented by the arithmetic device 14 executing the program. The storage unit 16 further stores chemical formula information of each substance included in the sample (a chemical formula, a chemical formula weight, and an electron number of each atom contained in the substance), and the weight ratio of the substances. The X-ray scattering patterns and other such information of the above-mentioned mixed substances are also stored.

The display unit 18 is a display device which displays a result of calculation by the arithmetic device 14. For example, the display unit 18 displays a degree of crystallinity of the target substance as a numerical value or a graph.

(Outline of Sample Measurement and Degree-of-Crystallinity Calculation)

Figure 2:
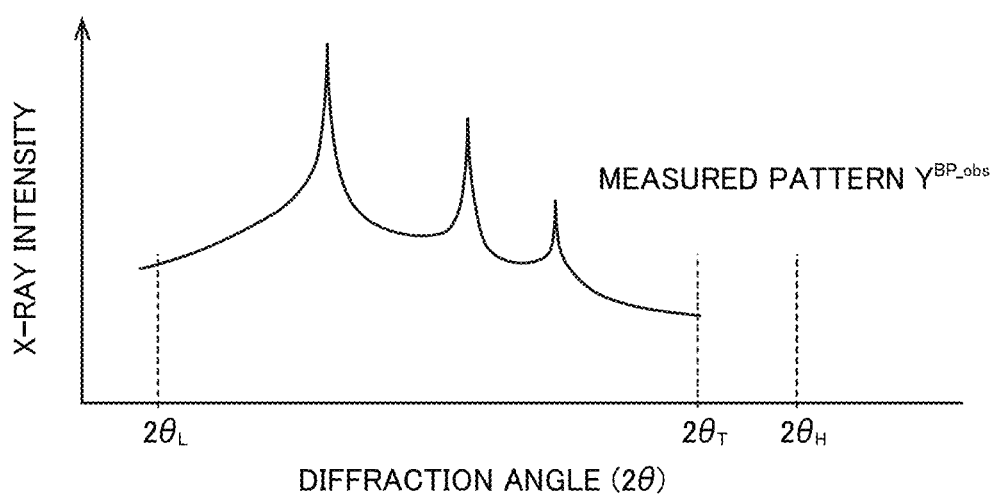
FIG. 2 is a graph schematically showing an example of an X-ray scattering pattern of a sample.

FIG. 2 is a graph schematically showing an example of an X-ray scattering pattern yBP_obs of the sample serving as the measurement target. The X-ray scattering pattern yBP_obs shown in FIG. 2 is measured by the X-ray diffractometer 12 and is stored in the storage unit 16. Although the reason will be described later, the X-ray scattering pattern of the sample is measured in a limited angle range from the minimum angle 2θL to a truncation angle 2θT (2θT<2θH).

Figure 3:
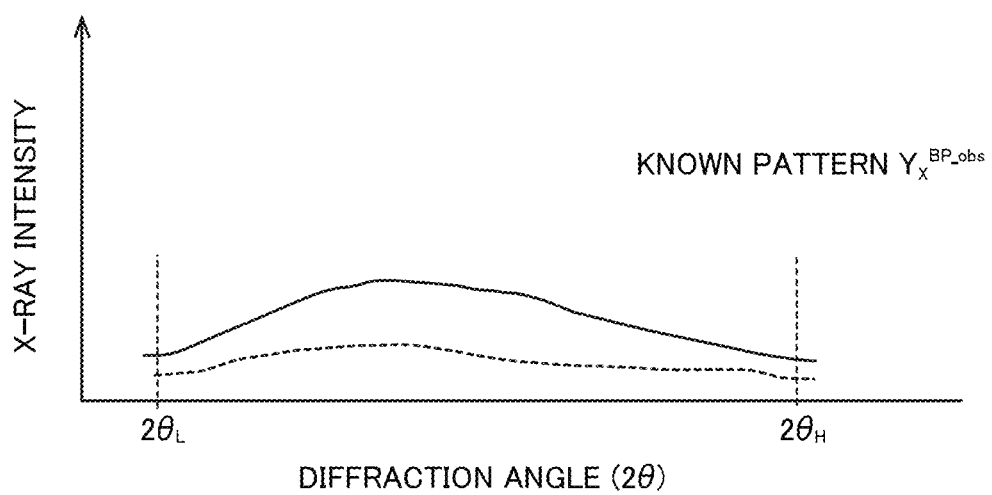
FIG. 3 is a graph schematically showing an example of an X-ray scattering pattern of a mixed substance.

As described above, the sample may include a plurality of mixed substances, but it is assumed here that the sample includes one type of mixed substance, and FIG. 3 shows an example of an X-ray scattering pattern yxBP-obs of the mixed substance. The pattern shown in FIG. 3 may be measured in advance by the X-ray diffractometer 12 or may be measured by another X-ray diffractometer. The X-ray scattering pattern yxBP-obs of the mixed substance is prepared over an angle range from 2θL to 2θH. Such an X-ray scattering pattern yxBP-obs of the mixed substance is stored in advance in the storage unit 16. The X-ray scattering pattern yxBP-obs of the mixed substance also contains a background intensity indicated by the broken line in FIG. 3, and this information is also stored in the storage unit 16. When an X-ray diffraction pattern of a substance obtained by crystallizing each single component in the mixed substance, or a crystalline substance that is similar in composition to the substance, is measured in advance, the background intensity can be easily extracted from the X-ray diffraction pattern.

The mixed substance may be amorphous, crystalline, or a mixture thereof. When the mixed substance is crystalline, the X-ray scattering pattern of the mixed substance is a diffraction pattern. Further, when the sample contains a plurality of mixed substances, data similar to that described above may be stored for each of the substances in the storage unit 16. Alternatively, the plurality of mixed substances having predetermined weight fractions as a whole may be regarded as one mixed substance, and data similar to that described above may be stored for the one mixed substance in the storage unit 16.

Figure 4:
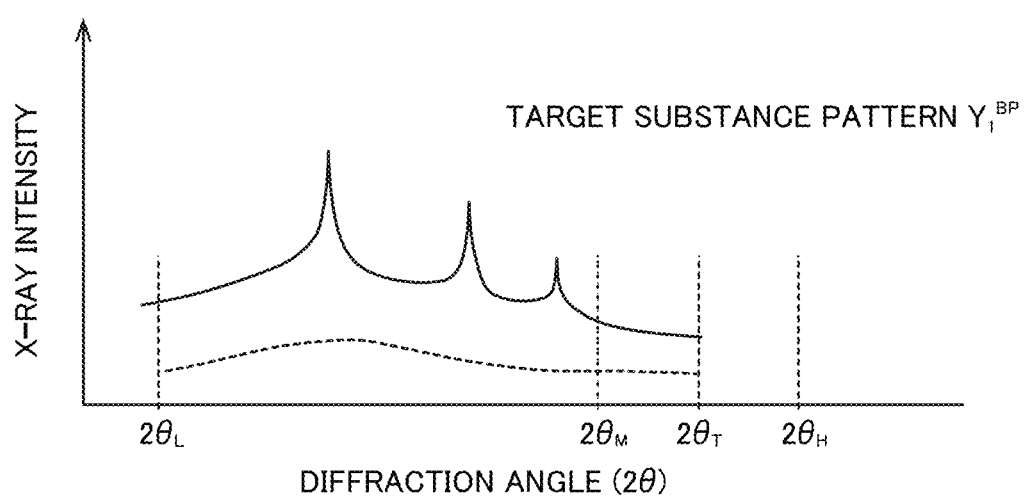
FIG. 4 is a graph schematically showing an example of an X-ray scattering pattern of a target substance.

FIG. 4 shows the target substance's contributory share of the measured pattern shown in FIG. 2. An X-ray scattering pattern y1BP shown in FIG. 4 is obtained by subtracting a pattern obtained by multiplying the X-ray scattering pattern yxBP_obs of the mixed substance shown in FIG. 3 by an appropriate scale factor SCk from the X-ray scattering pattern yBP_obs of the entire sample shown in FIG. 2. A method of calculating the scale factor SCk will be described later.

Figure 5:
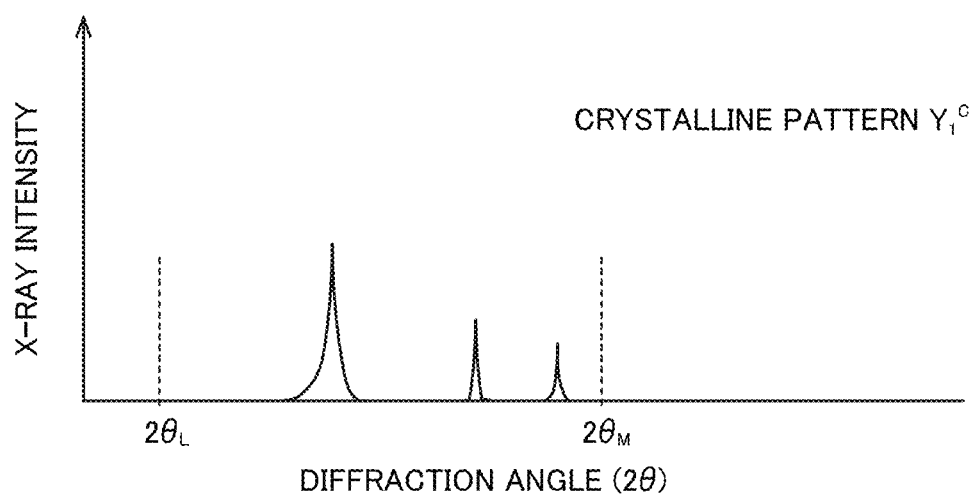
FIG. 5 is a graph schematically showing an X-ray diffraction pattern of a crystalline portion of the target substance.

FIG. 5 shows an X-ray diffraction pattern y1C derived from a crystalline portion of the target substance. The pattern shown in FIG. 5 can be easily obtained by extracting peaks (diffraction lines) from the pattern shown in FIG. 4. When the sample does not contain a crystalline mixed substance, the pattern shown in FIG. 5 may be directly obtained from the pattern shown in FIG. 2. The X-ray diffraction pattern y1C of the target substance is obtained in a range from $2\theta L$ to $2\theta M$ ($2\theta M<2\theta T$), where $2\theta M$ is a diffraction angle determined in advance above which X-ray diffraction lines cannot be observed.

In a first embodiment of the present disclosure to be described later, a value obtained by dividing an integrated intensity (with the correction with the Lorentz-polarization factor (Lp correction)) with an interval of integration from $2\theta L$ to $2\theta M$ in the crystalline pattern y1C shown in FIG. 5 by an integrated intensity (with the Lp correction, and with the effect of the background intensity removed) with an interval of integration from $2\theta L$ to $2\theta M$ in the target substance pattern y1BP shown in FIG. 4 is defined as a degree of crystallinity (DOCM) of the target substance.

Further, in a second embodiment of the present disclosure to be described later, the crystalline pattern y1C shown in FIG. 5 and the target substance pattern y1BP shown in FIG. 4 are similarly used, but a degree of crystallinity (DOC) that is even higher in accuracy than in the first embodiment is determined by a successive approximation method using a predetermined recurrence formula.

Figure 6:
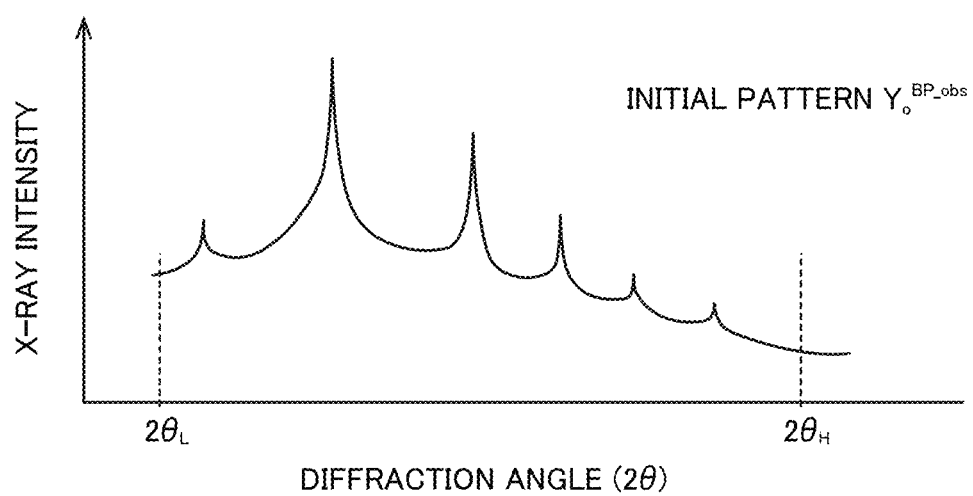
FIG. 6 is a graph schematically showing an example of an initial X-ray scattering pattern of the sample.

In this embodiment, for the sample as the measurement target per se, or for another sample having the same composition, the X-ray scattering pattern is measured in advance over the angle range from $2\theta L$ to $2\theta H$ as shown in FIG. 6. This pattern y0BP_obs is used in calculating the scale factor SCk described above.

(Theoretical Background: Degree of Crystallinity)

Now, the theoretical background of the degree-of-crystallinity calculation by the arithmetic device 14 will be described. For the analysis in the arithmetic device 14, a relatively new quantitative analysis approach invented by the inventor of the present invention is applied, and the degree of crystallinity of the target substance is formulated to indicate weight fractions of the crystalline portion and an amorphous portion. Further, the above-mentioned new quantitative analysis approach is applied to calculate the scale factor SCk described above. The above-mentioned quantitative analysis approach is also described in, for example, J. Appl. Cryst. (2016). 49, 1508-1516, Japanese Patent No. 6231726, Japanese Patent Translation Publication No. 2017/149913, and the like.

The following equation (1) is a relational expression of an integrated intensity Yk derived from each substance, which is derived by the above-mentioned new quantitative analysis approach, in which "k" is an ordinal number indicating the substance.

$$Y_k = \frac{w_k}{a_k} \sum_{k'=1}^{K} a_{k'} Y_{k'} \quad (1)$$

Here, Yk is expressed by the following equation (2), in which $y(2\theta)k$ is an X-ray scattering pattern of the k-th substance, and $G(2\theta)$ is an Lp correction factor. An interval of integration is the entire interval of integration from $2\theta L$, which is about 10°, to $2\theta H$, which is about 120°, for example.

$$Y_k = \int y(2\theta)_k G(2\theta) d(2\theta) \quad (2)$$

Further, a reciprocal of $a_k$ is given by the following equation (3). In the equation, $N_A$ is the number of atoms contained in a chemical formula of the k-th substance, $n_{ki}$ is an electron number of the i-th atom contained in the chemical formula of the k-th substance, and $M_k$ is a chemical formula weight of the k-th substance contained in the sample.

$$a_k^{-1} = \frac{\sum_{i=1}^{N_A} n_{ki}^2}{M_k} \quad (3)$$

The equation (1) can also be expressed as the following equation (4).

$$w_k = \frac{a_k Y_k}{\sum_{k'=1}^{K} a_{k'} Y_{k'}} \quad (4)$$

When a weight ratio between the crystalline portion and the amorphous portion of the target substance is defined as the degree of crystallinity, the degree of crystallinity DOC of the k-th substance is expressed by the following equation (5). In the equation, $W_{kC}$ is a weight of the crystalline portion in the k-th substance, $W_{kA}$ is a weight of the amorphous portion in the k-th substance, $w_k c$ is a weight fraction of the crystalline portion in the k-th substance, and $w_{kA}$ is a weight fraction of the amorphous portion in the k-th substance.

$$DOC = \frac{W_{kC}}{W_{kC} + W_{kA}} = \frac{w_{kC}}{w_{kC} + w_{kA}} \quad (5)$$

When a weight fraction of the k-th substance in the sample is represented by $w_k$, $w_k$ is expressed by the following equation (6).

$$w_k = w_{kC} + w_{kA} \quad (6)$$

It is assumed here that k=1 and that the 1st substance is a target for calculating the degree of crystallinity, that is, the target substance. When the equation (6) is substituted into the equation (5), and the equation (4) is further substituted, the following equation (7) is obtained for the degree of crystallinity DOC of the 1st substance. In the equation, $Y_{1C}$ is an integrated intensity with the Lp correction of the X-ray diffraction pattern $y_1^C$ derived from a crystalline portion of the 1st substance (see an equation (19)), and $Y_{1A}$ is an integrated intensity with the Lp correction of an X-ray diffraction pattern derived from an amorphous portion of the 1st substance. In any case, an interval of integration is the entire range from $2\theta_L$ to $2\theta_H$, for example.

$$DOC = \frac{Y_{1C}}{Y_1} = \frac{Y_{1C}}{Y_{1C} + Y_{1A}} \quad (7)$$

In accordance with the equation (7), when an integrated intensity $Y_1$ with the Lp correction of the X-ray scattering pattern of the entire target substance and an integrated intensity $Y_{1C}$ with the Lp correction of the X-ray diffraction pattern of the crystalline portion in the target substance are known, the degree of crystallinity DOC can be determined.

(Theoretical Background: Background Intensity)

As described above, the X-ray scattering pattern contains the background intensity. When the entire X-ray scattering pattern of the k-th substance is represented by $y(2\theta)_k^{BP}$, the background intensity is represented by $y(2\theta)_{BG}$, and a component derived from only the k-th substance is represented by $y(2\theta)_k$, the following equation (8) is established.

$$y(2\theta)_k^{BP} = Y(2\theta)_k + y(2\theta)_{BG} \quad (8)$$

Here, integrated intensities of $y(2\theta)_k^{BP}$, $y(2\theta)_k$, and $y(2\theta)_{BG}$ are expressed by an equation (9) to an equation (11), respectively. These equations hold over a suitable and common interval of integration.

$$Y_k^{BP} = \int y(2\theta)_k^{BP} G(2\theta) d(2\theta) \quad (9)$$

$$Y_k = \int y(2\theta)_k G(2\theta) d(2\theta) \quad (10)$$

$$B_k = \int y(2\theta)_{BG} G(2\theta) d(2\theta) \quad (11)$$

From the expression (8), $Y_k^{BP}$, $Y_k$, and $B_k$ have a relationship of the following equation (12).

$$Y_k^{BP} = Y_k + B_k \quad (12)$$

When a background ratio $R_k$ of the k-th substance is defined by the following equation (13), the equation (12) can be rewritten as an equation (14).

$$R_k = B_k/Y_k \quad (13)$$

$$Y_k^{BP} = (1+R_k)Y_k \quad (14)$$

In other words, with the equation (14), an integrated intensity $Y_k^{BP}$ with the background and an integrated intensity $Y_k$ without the background can be mutually converted using the background ratio $R_k$.

(Theoretical Background: Calculation of Degree of Crystallinity DOC (Part 1))

In accordance with the DD method, a calculated integrated intensity $Y_k^{BP\_calc}$ of the k-th substance is given by the following equation (15).

$$Y_k^{BP\_calc} = (1 + R_k)\frac{w_k}{a_k}\sum_{k'=1}^{K} a_{k'} Y_{k'} \quad (15)$$

The integrated intensity $Y_k^{BP}$ of the k-th substance is considered as being obtained by prorating an observed integrated intensity $Y^{BP\_obs}$ of the entire sample by a ratio of the calculated integrated intensity $Y_k^{BP\_calc}$, and hence the following equation (16) is established.

$$Y_k^{BP} = \frac{Y_k^{BP\_calc}}{Y^{BP\_calc}} Y^{BP\_obs} = \frac{(1+R_k)w_k a_k^{-1}}{D} \cdot Y^{BP\_obs} \quad (16)$$

In the equation, YBP_calc is given by the following equation (17), and D is given by an equation (18) after the next.

$$Y^{BP\_calc} = Y_1^{BP\_calc} + Y_2^{BP\_calc} + \ldots + Y_K^{BP\_calc} \quad (17)$$

$$D = \sum_{k'=1}^{K}(1+R_{k'})w_{k'}a_{k'}^{-1} \quad (18)$$

In other words, the integrated intensity $Y_1^{BP}$ of the 1st substance serving as the target substance can be calculated based on the observed integrated intensity $Y^{BP\_obs}$ of the entire sample, and $R_k$, $w_k$, and $a_k$ of every substance in the sample. All of those items of information can be grasped at the time of preparing the sample. Further, $Y_1^{BP}$ can be transformed to $Y_1$ using the equation (14). Still further, the integrated intensity $Y_{1C}$ of the crystalline portion of the target substance can be calculated by the following equation (19). Through substitution of the thus-acquired $Y_1$ and $Y_{1C}$ into the equation (7), the degree of crystallinity DOC can be obtained.

$$Y_{1C} = \int y(2\theta)_1^C G(2\theta) d(2\theta) \quad (19)$$

(Theoretical Background: Calculation of Degree of Crystallinity DOC (Part 2))

The degree of crystallinity DOC of the equation (7), which is derived on the basis of the new quantitative analysis approach, is based on the premise that an interval of integration in calculating the integrated intensities $Y_{1C}$ and $Y_1$ is the entire range. In order to calculate those values, it is required to accurately identify the X-ray scattering pattern from the crystalline portion included in the target substance. However, the diffraction pattern $y_1^C$ from the crystalline portion, which has weak diffraction intensity in a high-angle region, is buried in scattering patterns from the amorphous portion and other substances, and is difficult to identify. This leads to underestimation of $Y_{1C}$ and the degree of crystallinity DOC.

Thus, in order to calculate a more likely approximate value of the degree of crystallinity DOC, it is considered to limit the interval of integration in calculating the integrated intensities $Y_{1C}$ and $Y_1$.

An X-ray scattering pattern $y(2\theta)^{BP}$ with the background of the entire sample is expressed by the following equation (20). In the equation, $y(2\theta)_1^{BP}$ is an X-ray scattering pattern with the background of the 1st substance (target substance), $y(2\theta)_k^{BP}$ is an X-ray scattering pattern with the background of the k-th substance (mixed substance), and $S_{Ck}$ is a scale factor.

$$y(2\theta)^{BP} = y(2\theta)_1^{BP} + \Sigma_{k'=2}^K S_{Ck'} y(2\theta)_{k'}^{BP\_obs} \quad (20)$$

Here, when $y(2\theta)_k^{BP}$ is known for the mixed substance, the following equation (21) is established for k=2 to K based on the equation (20) and the equation (16). Then, the scale factor $S_{Ck}$ can be obtained from the equation (21).

$$S_{Ck} \int_{2\theta_L}^{2\theta_H} y(2\theta)_k^{BP\_obs} G(2\theta) d(2\theta) = \frac{(1+R_k) w_k a_k^{-1}}{D} \cdot Y^{BP}{}_{obs} \text{ (for } 2 \leq k \leq K) \quad (21)$$

When the thus-obtained scale factor $S_{Ck}$ is used, for any given interval of integration ($2\theta^X$ to $2\theta^Y$) as in the following equation (22), an integrated intensity $Y_{XP}^{BP}$ ($=y_1^{BP}$) of the target substance can be determined by the following equation (22).

$$Y_{XY}^{BP} = Y_1^{BP} = \int_{2\theta_X}^{\theta_Y} \{y(2\theta)^{BP\_obs} - \Sigma_{k'=2}^K S_{Ck'} \cdot y(2\theta)_{k'}^{BP\_obs}\} G(2\theta) d(2\theta) \quad (22)$$

Over the interval of integration ($2\theta_X$ to $2\theta_Y$), an integrated intensity $Y_{C\text{-}XY}$ ($=Y_1^C$) of the crystalline portion of the target substance can also be determined by the following equation (23).

$$Y_{C\text{-}XY} = Y_{1C} \int_{2\theta_X}^{2\theta_Y} y(2\theta)_1^C G(2\theta) d(2\theta) \quad (23)$$

Through substitution of those values into the equation (7), the degree of crystallinity DOC of the target substance can be determined approximately.

Now, accuracy of the degree of crystallinity obtained by limiting the interval of integration as described above is evaluated.

Figure 7:
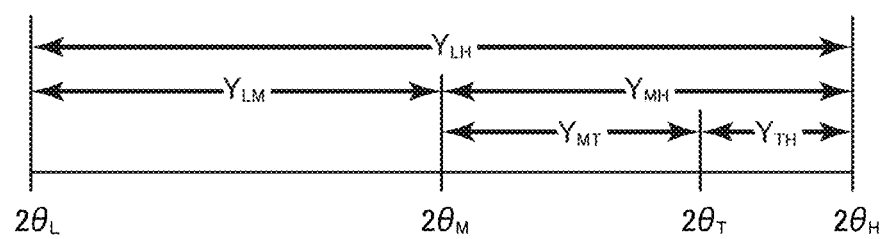
FIG. 7 is a diagram illustrating a relationship between an interval of integration and an intensity integral value.

FIG. 7 shows an integrated intensity $Y_{XY}$ of the target substance in various interval of integrations from $2\theta_X$ to $2\theta_Y$. Here, X is L, M, or T, and Y is M, T, or H. Further, in the following description, $Y_{C\text{-}XY}$ is an integrated intensity over an interval of integration from $2\theta_X$ to $2\theta_Y$ of the crystalline portion of the target substance, and $Y_{A\text{-}XY}$ is an integrated intensity over an interval of integration from $2\theta_X$ to $2\theta_Y$ of the amorphous portion of the target substance.

In accordance with the above notation, the equation (7) can be expressed as the following equation (24).

$$DOC = \frac{Y_{C\text{-}LH}}{Y_{LH}} \quad (24)$$

Further, when a degree of crystallinity in a case in which the interval of integration is limited to $2\theta_L$ to $2\theta_M$ is notated as $DOC_M$, $DOC_M$ can be defined as the following equation (25).

$$DOC_M = \frac{Y_{C\text{-}LM}}{Y_{LM}} \quad (25)$$

An error $\Delta DOC_M$ between the degree of crystallinity DOC of the equation (24) and the degree of crystallinity $DOC_M$ of the equation (25) can be expressed as the following equation (26).

$$\Delta DOC_M = DOC_M - DOC \quad (26)$$

The equation (26) can be transformed to the following equation (27).

$$\Delta DOC_m = DOC_M \cdot DOC \cdot \frac{Y_{C\text{-}MH}}{Y_{C\text{-}LM} + Y_{C\text{-}MH}} \left( \frac{Y_{A\text{-}MH}}{Y_{C\text{-}MH}} - \frac{Y_{A\text{-}LM}}{Y_{C\text{-}LM}} \right) \quad (27)$$

Here, the following equation (28), which is a parenthesized value in the right-hand side of the equation (27), is about 0.11 in accordance with consideration by the inventor.

$$\frac{Y_{A\text{-}MH}}{Y_{C\text{-}MH}} - \frac{Y_{A\text{-}LM}}{Y_{C\text{-}LM}} \quad (28)$$

Further, the portion of the following equation (29) in the right-hand side of the equation (27) is about 0.5 when $2\theta_M$ is around 70° in accordance with consideration by the inventor.

$$\frac{Y_{C\text{-}MH}}{Y_{C\text{-}LM} + Y_{C\text{-}MH}} \quad (29)$$

Thus, when the degree of crystallinity is about 40%, $\Delta DOC_M$ can be estimated to be about 0.0088. This means that, as long as other errors are small, even when the interval of integration is limited, the following equation (30) is established, that is, $DOC_M$ is a good approximate value of DOC.

$$DOC_M \approx DOC \quad (30)$$

(Theoretical Background: Calculation of Degree of Crystallinity DOC (Part 3))

$DOC_M$ is a good approximate value of DOC, but when the X-ray scattering pattern of the sample is measured up to $2\theta_T$, which is an angle higher than $2\theta_M$, DOC can be brought even closer to a true value.

First, an initial value $DOC_T$ is defined as expressed by the following equation (31).

$$DOC_T = \frac{Y_{C\text{-}LM}}{Y_{LM} + Y_{MT}} \quad (31)$$

An error $\Delta DOC_T$ between the degree of crystallinity DOC of the equation (24) and the degree of crystallinity $DOC_T$ of the equation (31) can be expressed as the following equation (32).

$$\Delta DOC_T = DOC_T - DOC \quad (32)$$

$\Delta DOC_T$ can be transformed to the following equation (33).

$$\Delta DOC_T = -DOC \frac{1}{Y_{LM} + Y_{MT}} \left[ Y_{LM} + Y_{MT} - \frac{Y_{C\text{-}LM}}{DOC} \right] \quad (33)$$

Here, the following equation (34) is obtained based on the equation (30), and the equation (33) can be transformed to an equation (35).

$$DOC \approx Y_{C-LM}/Y_{LM} \quad (34)$$

$$\Delta DOC_T \approx -DOC \cdot \frac{Y_{MT}}{Y_{LM} + Y_{MT}} \quad (35)$$

DOC, $DOC_T$, and $\Delta DOC_T$ have a relationship of an equation (36), and hence a recurrence formula of an equation (37) is obtained using the equation (35).

$$DOC = DOC_T - \Delta DOC_T \quad (36)$$

$$DOC = DOC_T + DOC \cdot \frac{Y_{MT}}{Y_{LM} + Y_{MT}} \quad (37)$$

In the equation (37), $DOC_T$ is substituted as an initial value of DOC on the right-hand side to calculate DOC on the left-hand side. Then, the thus-obtained DOC is substituted again into DOC on the right-hand side. This can be repeated to obtain a degree of crystallinity DOC that is close to the true value.

First Embodiment

Now, the first embodiment will be described. The first embodiment corresponds to "Calculation of Degree of Crystallinity DOC (Part 2)" described above.

Figure 8:
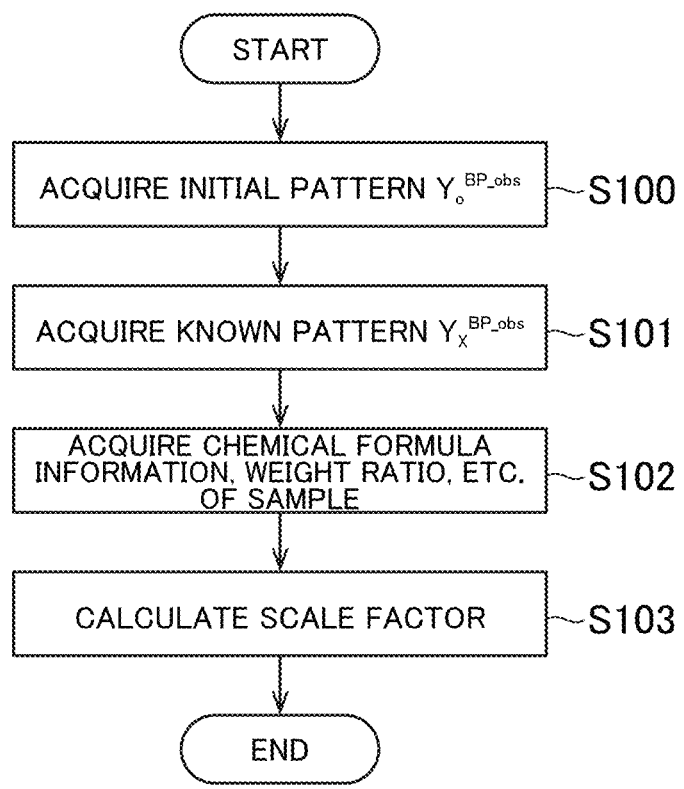
FIG. 8 is a flowchart illustrating scale factor calculation processing.

In the first embodiment, the scale factor SCk is first calculated in accordance with a flowchart of FIG. 8. Thus, the arithmetic device 14 reads the initial pattern y0BP_obs (see FIG. 6) from the storage unit 16 (Step S100).

Next, the arithmetic device 14 reads the known pattern yxBP-obs (see FIG. 3) of the mixed substance from the storage unit 16 (Step S101). Here, one type of mixed substance is used, and "k" for the mixed substance is 2.

Further, the arithmetic device 14 reads, for each of the substances (the target substance and the mixed substance) forming the sample, the chemical formula, the chemical formula weight $M_k$, and the electron number $n_{ki}$, the weight fraction $w_k$, and the background ratio $R_k$ of each atom contained in the chemical formula of the substance from the storage unit 16 (Step S102).

After that, the arithmetic device 14 calculates a scale factor SC2 in accordance with the equation (21) and stores the calculated scale factor SC2 in the storage unit 16 (Step S103).

Figure 9:
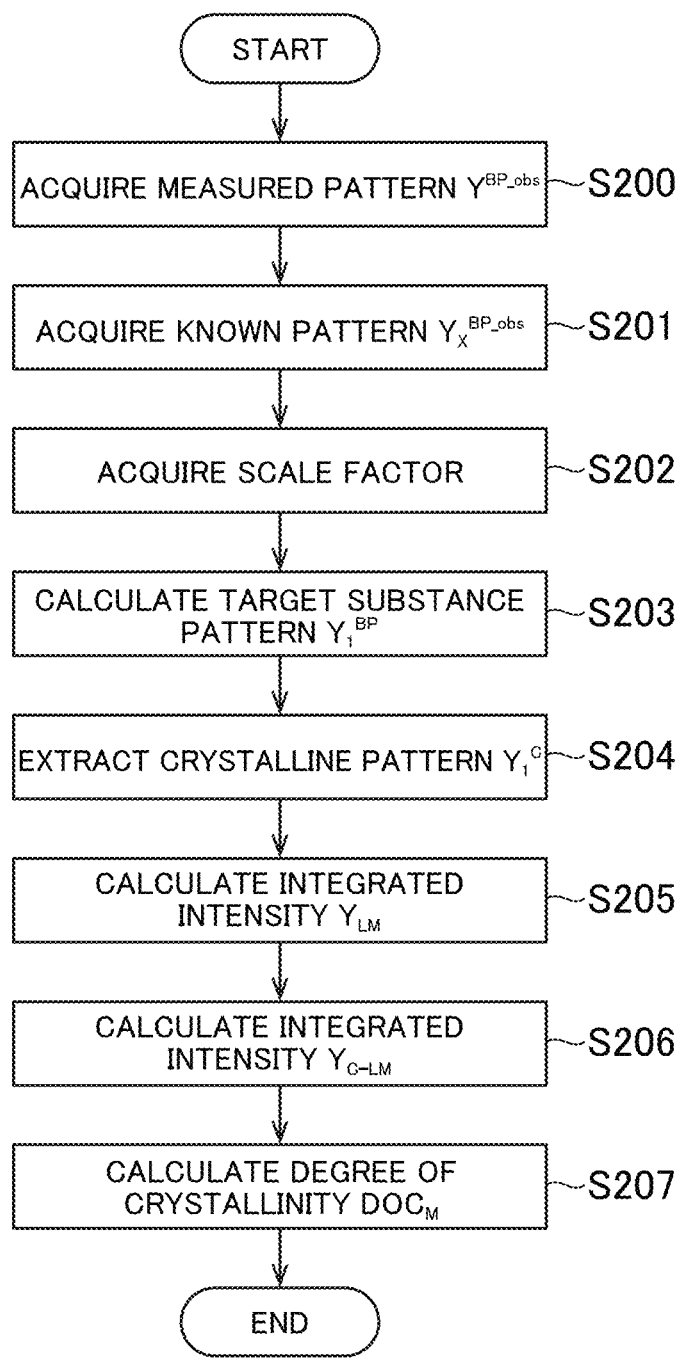
FIG. 9 is a flowchart illustrating degree-of-crystallinity calculation processing according to a first embodiment of the present disclosure.

Next, the arithmetic device 14 calculates the degree of crystallinity DOCM in accordance with a flowchart of FIG. 9. To that end, the arithmetic device 14 first reads the measured pattern yBP_obs (see FIG. 2) from the storage unit 16 (Step S200). The measured pattern yBP_obs is an X-ray scattering pattern of the entire sample and is measured by the X-ray diffractometer 12.

Next, the arithmetic device 14 reads the known pattern yxBP_obs (FIG. 3) of the mixed substance from the storage unit 16 (Step S201). Further, the arithmetic device 14 reads the scale factor SC2 calculated in Step S103 from the storage unit 16 (Step S202).

The arithmetic device 14 calculates the target substance pattern y1BP (see FIG. 4) based on the data obtained in Step S200 to Step S202 (Step S203). The target substance pattern y1BP is a portion excluding the Lp correction factor $G(2\theta)$ of the integrand on the right-hand side of the equation (22).

Further, the arithmetic device 14 extracts diffraction lines from an angle range from $2\theta L$ to $2\theta M$ of the target substance pattern y1BP obtained in Step S203, to thereby extract a crystalline pattern y1C (see FIG. 5) (Step S204).

After that, the arithmetic device 14 calculates an integrated intensity YLM (Step S205). Specifically, the arithmetic device 14 calculates YLMBP based on the equation (22). Further, the arithmetic device 14 reads a background ratio R1 (calculated over an interval of integration from $2\theta L$ to $2\theta M$) stored in advance in the storage unit 16 and converts YLMBP into YLM using the equation (14). The X-ray scattering pattern y1BP of the target substance also contains a background intensity indicated by the broken line in FIG. 4, and this information is stored in the storage unit 16. When an X-ray diffraction pattern of a substance obtained by crystallizing the mixed substance, or a crystalline substance that is similar in composition to the substance, is measured in advance, the background intensity can be easily extracted from the X-ray diffraction pattern. Further, in the storage unit 16, the background ratio R1 for the target substance calculated over the interval of integration from $2\theta L$ to $2\theta M$ is also stored in advance.

Further, the arithmetic device 14 integrates the crystalline pattern y1C obtained in Step S204 over the angle range from $2\theta L$ to $2\theta M$ and with the Lp correction to acquire an integrated intensity YC-LM (Step S206). Then, YC-LM obtained in Step S206 is divided by YLM obtained in Step S205 to obtain the degree of crystallinity DOCM (Step S207). With the processing described above, a likely value of the degree of crystallinity can be obtained for the target substance.

Second Embodiment

Now, the second embodiment will be described. The second embodiment corresponds to "Calculation of Degree of Crystallinity DOC (Part 3)" described above.

In the second embodiment, the arithmetic device 14 first calculates the scale factor SCk in accordance with the flowchart of FIG. 8. This processing is similar to that in the first embodiment, and hence description thereof is omitted here.

Figure 10:
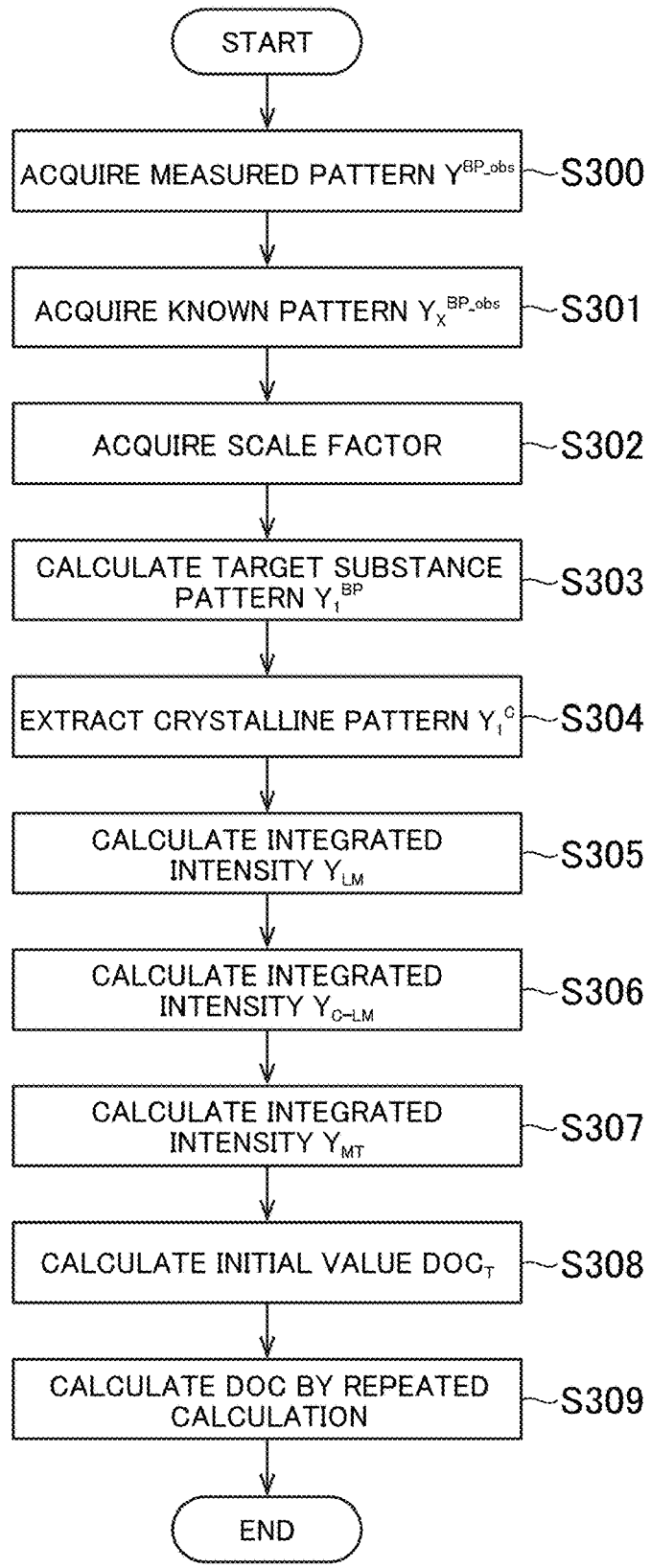
FIG. 10 is a flowchart illustrating degree-of-crystallinity calculation processing according to a second embodiment of the present disclosure.

Next, the arithmetic device 14 calculates the degree of crystallinity DOC in accordance with a flowchart of FIG. 10. Step S300 to Step S306 of FIG. 10 are similar to Step S200 to Step S206 of FIG. 9, and hence description thereof is omitted here.

In Step S307, the arithmetic device 14 calculates an integrated intensity YMT. Specifically, the arithmetic device 14 calculates YMTBP based on the equation (22). Further, the arithmetic device 14 reads a background ratio R1 (calculated over an interval of integration from $2\theta M$ to $2\theta T$) stored in advance in the storage unit 16, and converts YMTBP into YMT using the equation (14).

Next, the arithmetic device 14 substitutes the values obtained in Step S305 to Step S307 into the equation (31) to calculate the initial value DOCT (Step S308). Then, the arithmetic device 14 substitutes the values obtained in Step S305, Step S307, and Step S308 into the right-hand side of the recurrence formula (37) to obtain DOC on the left-hand side. This calculation is repeated a predetermined number of times, or until a value of DOC converges to obtain the final DOC (Step S309). With the processing described above, a more likely value of the degree of crystallinity can be obtained for the target substance.

The present disclosure is not limited to the embodiments described above. Various modifications can be made within the spirit of the present disclosure, and such modifications are also encompassed in the scope of the present disclosure.

What is claimed is:

1. A degree-of-crystallinity measurement apparatus, comprising:
   a measured pattern acquisition unit configured to acquire a measured X-ray scattering pattern of a sample containing a target substance and another known mixed substance,
   a known pattern acquisition unit configured to acquire a known X-ray scattering pattern of the other known mixed substance,
   a crystalline pattern acquisition unit configured to at least partially acquire, based on the measured X-ray scattering pattern of the sample, an X-ray diffraction pattern of a crystalline portion included in the target substance,
   a crystalline integrated intensity calculation unit configured to calculate an integrated intensity for the acquired X-ray diffraction pattern of the crystalline portion,
   a target substance integrated intensity calculation unit configured to calculate an integrated intensity for an X-ray scattering pattern of the target substance based on the measured X-ray scattering pattern of the sample and the known X-ray scattering pattern; and
   a degree-of-crystallinity calculation unit configured to calculate a degree of crystallinity of the target substance based on the integrated intensity for the X-ray diffraction pattern of the crystalline portion and the integrated intensity for the X-ray scattering pattern of the target substance.

2. The degree-of-crystallinity measurement apparatus according to claim 1, wherein the target substance integrated intensity calculation unit is configured to calculate the integrated intensity for the X-ray scattering pattern of the target substance based on the measured X-ray scattering pattern of the sample, the known X-ray scattering pattern, chemical formula weights of the target substance and the other known mixed substance, and an electron number of each atom belonging to chemical formulae of the target substance and the another known mixed substance.

3. The degree-of-crystallinity measurement apparatus according to claim 2,
   wherein the target substance integrated intensity calculation unit includes a unit configured to subtract a value obtained by multiplying an integrated intensity for the known X-ray scattering pattern by a scale factor from an integrated intensity for the measured X-ray scattering pattern of the sample, and
   wherein the target substance integrated intensity calculation unit is configured to calculate the scale factor based on the chemical formula weights of the target substance and the other known mixed substance, and the electron number of each atom belonging to the chemical formulae of the target substance and the another known mixed substance.

4. The degree-of-crystallinity measurement apparatus according to claim 2, wherein the target substance integrated intensity calculation unit is configured to calculate an integrated intensity subjected to Lorentz-polarization correction.

5. The degree-of-crystallinity measurement apparatus according to claim 1, wherein the degree-of-crystallinity calculation unit is configured to calculate the degree of crystallinity of the target substance by a successive approximation method based on a predetermined recurrence formula.

6. The degree-of-crystallinity measurement apparatus according to claim 5, wherein the predetermined recurrence formula is expressed as:

$$DOC = DOC_T + DOC \times (Y_{MT}/Y_{LM} + Y_{MT}),$$

where:
DOC is a degree of crystallinity of the target substance,
$Y_{LM}$ is an integrated intensity for the X-ray scattering pattern of the target substance with an interval of integration from a first diffraction angle to a second diffraction angle,
$Y_{MT}$ is an integrated intensity for the X-ray scattering pattern of the target substance with an interval of integration from the second diffraction angle to a third diffraction angle; and
$DOC_T$ is expressed by the following equation:

$$DOC_T = Y_{C-LM}/(Y_{LM} + Y_{MT}),$$

where $Y_{C-LM}$ is an integrated intensity for the X-ray diffraction pattern of the crystalline portion with an interval of integration from the first diffraction angle to the second diffraction angle.

7. A degree-of-crystallinity measurement method, comprising:
   a measured pattern acquisition step of acquiring a measured X-ray scattering pattern of a sample containing a target substance and another known mixed substance,
   a known pattern acquisition step of acquiring a known X-ray scattering pattern of the other known mixed substance,
   a crystalline pattern acquisition step of at least partially acquiring, based on the measured X-ray scattering pattern of the sample, an X-ray diffraction pattern of a crystalline portion included in the target substance,
   a crystalline integrated intensity calculation step of calculating an integrated intensity for the acquired X-ray diffraction pattern of the crystalline portion,
   a target substance integrated intensity calculation step of calculating an integrated intensity for an X-ray scattering pattern of the target substance based on the measured X-ray scattering pattern of the sample and the known X-ray scattering pattern; and
   a degree-of-crystallinity calculation step of calculating a degree of crystallinity of the target substance based on the integrated intensity for the X-ray diffraction pattern of the crystalline portion and the integrated intensity for the X-ray scattering pattern of the target substance.

8. A non-transitory computer-readable information storage medium storing a program for causing a computer to execute:
   a measured pattern acquisition step of acquiring a measured X-ray scattering pattern of a sample containing a target substance and another known mixed substance,
   a known pattern acquisition step of acquiring a known X-ray scattering pattern of the other known mixed substance,
   a crystalline pattern acquisition step of at least partially acquiring, based on the measured X-ray scattering pattern of the sample, an X-ray diffraction pattern of a crystalline portion included in the target substance,
   a crystalline integrated intensity calculation step of calculating an integrated intensity for the acquired X-ray diffraction pattern of the crystalline portion, a target substance integrated intensity calculation step of calculating an integrated intensity for an X-ray scattering pattern of the target substance based on the measured X-ray scattering pattern of the sample and the known X-ray scattering pattern; and
a degree-of-crystallinity calculation step of calculating a degree of crystallinity of the target substance based on the integrated intensity for the X-ray diffraction pattern of the crystalline portion and the integrated intensity for the X-ray scattering pattern of the target substance.

* * * * *